United States Patent
Vogelsang et al.

(10) Patent No.: US 6,913,437 B2
(45) Date of Patent: Jul. 5, 2005

(54) HYDRODYNAMIC COMPONENT

(75) Inventors: Klaus Vogelsang, Crailsheim (DE);
Reinhard Kernchen, Satteldorf (DE);
Werner Klement, Heidenheim (DE)

(73) Assignee: Voith Turbo GmbH & Co. KG (DE)

( * ) Notice: Subject to any disclaimer, the term of this patent is extended or adjusted under 35 U.S.C. 154(b) by 5 days.

(21) Appl. No.: 10/363,486

(22) PCT Filed: Aug. 29, 2001

(86) PCT No.: PCT/EP01/09961

§ 371 (c)(1),
(2), (4) Date: Jun. 18, 2003

(87) PCT Pub. No.: WO02/18813

PCT Pub. Date: Mar. 7, 2002

(65) Prior Publication Data

US 2004/0112047 A1 Jun. 17, 2004

(30) Foreign Application Priority Data

Aug. 30, 2000 (DE) .......................................... 100 42 865
Sep. 20, 2000 (DE) .......................................... 100 46 839

(51) Int. Cl.⁷ .............................................. F04D 13/16
(52) U.S. Cl. ........................ 415/66; 415/178; 416/180; 416/197 C
(58) Field of Search ................................ 415/177, 180, 415/116, 60, 66, 175, 178; 416/180, 197 C, 198 R; 60/351, 357, 358

(56) References Cited

U.S. PATENT DOCUMENTS

| 2,110,454 A | | 3/1938 | Sinclair |
| 3,157,999 A | | 11/1964 | Nelson |
| 3,167,918 A | * | 2/1965 | Alexandrescu ............... 60/366 |
| 3,178,889 A | | 4/1965 | Nelden |
| 3,405,524 A | * | 10/1968 | Nelden ......................... 60/337 |
| 4,423,803 A | | 1/1984 | Malloy ....................... 192/3.29 |
| 6,357,229 B1 | * | 3/2002 | Schust et al. .................. 60/357 |

FOREIGN PATENT DOCUMENTS

| FR | 2276516 | 1/1976 |
| GB | 328028 | 4/1930 |
| GB | 363169 | 12/1931 |
| GB | 1346677 | 2/1974 |
| GB | 2 172 965 A | 10/1986 |

OTHER PUBLICATIONS

International Search Report.

* cited by examiner

*Primary Examiner*—Ninh H. Nguyen
(74) *Attorney, Agent, or Firm*—Ostrolenk, Faber, Gerb & Soffen, LLP

(57) ABSTRACT

A hydrodynamic component with at least two rotating impellers which form a working chamber for a working circuit. A closed circuit coupled to the inlet to the working chamber and to the outlet from the working chamber. The closed circuit is pressure tight. Pressure control for the closed circuit.

13 Claims, 4 Drawing Sheets

HYDRODYNAMIC COMPONENT

The invention relates to a hydrodynamic component, having features including two compellers forming a working chamber, a closed circuit coupled to the inlet and an outlet from the working chamber.

Hydrodynamic components in the form of hydrodynamic couplings or hydrodynamic speed/torque converters for use as starting elements in drive trains are known in a large number of designs. As a representative of these, reference is made to the Voith document "Hydrodynamik in der Antriebstechnik" [Hydrodynamics in drive engineering], Vereinigte Fachverlage, Kraußkopf Ingenieur-Digest, 1987 with regard to the general construction of these elements and their use in stationary or mobile drive systems. In this case, different systems for filling and emptying are known. As a rule, filling and emptying are carried out in an open system, comprising an operating medium container which is coupled to the working chamber. In addition, means for cooling the operating medium in the working circuit are assigned to the hydrodynamic component. In general, this is carried out via an external circuit assigned to the working circuit, operating medium being led out of the working circuit into the external circuit, particularly via cooling devices or heat exchangers, during the operating of the hydrodynamic component. The control of the filling level is in this case carried out via appropriate actuating devices, either by controlling the inlet and outlet from the working chamber and to the working chamber, the discharge of operating medium from the working chamber and intermediate storage in a separate storage chamber or by a combination of both possibilities.

SUMMARY OF THE INVENTION

The invention is based on the object of developing a hydrodynamic component of the type cited at the beginning for use in starting units for drive systems in such a way that a plurality of functions, in particular the implementation of the cooling of the operating medium, control of the filling level and the filling and emptying, can be implemented with a minimum number of components and with little outlay on construction.

The solution according to the invention is comprises a device for at least one of filling and emptying a working chamber of a hydrodynamic component via a closed circuit and device for selectively filling and emptying the circuit and for predefining pressure in the closed circuit.

According to the invention, a hydrodynamic component comprises at least two rotating circuit parts in the form of two impellers which cooperate to form at least one toroidal working chamber, which can be filled with operating medium and in which, during operation of the hydrodynamic components, a rotating working circuit is established. The toroidal working chamber has an inlet and an outlet, which are connected to a closed circuit. That circuit comprises the working circuit and an external part, that is a part led outside the toroidal working chamber, which is coupled to the working circuit. According to the invention, this closed circuit is designed to be pressure-tight. This means in detail that the inlet, in particular the inlet chamber to the working chamber, and the outlet, in particular the outflow chamber, are designed to be leakproof with respect to the hydrodynamic component and, moreover, the operating medium guide section between the inlet and the outlet in the external part of the closed circuit, that is to say outside the toroidal working chamber, is sealed off completely.

The solution according to the invention makes it possible that, during the operation of the hydrodynamic component, when operating medium is discharged from the working circuit into the external part of the closed circuit, operating medium is guided in the external part of the circuit and, since the total circuit is of closed design, is fed to the inlet again. Because of the pressure-tight design, during the operation of the hydrodynamic component, that is to say during rotation of an impeller and of at least one further impeller caused by this as a result of being driven by means of the working circuit, a pressure self-generated by the hydrodynamic component in the closed system is maintained. This circuit on its own can even be designated a cooling circuit, since heat can be dissipated as a result of thermal radiation via the line connections between the outlet and the inlet. A cooling circuit is therefore already possible with this design.

If, under a further aspect, means for producing an influencing pressure on the operating medium led in the closed circuit are provided, there is additionally the possibility of controlling the filling level of the hydrodynamic component.

Under a further aspect, at least one junction is arranged in the closed circuit to an optional connection means for filling and/or emptying and/or means for predefining the pressure in the system. In this case, the means for predefining the pressure are preferably connected in a pressure-tight manner to the closed circuit and serves to generate a static superimposed pressure in the closed circuit. The means for predefining the pressure preferably comprise a container which is sealed in a pressure-tight manner and which is connected in a pressure-tight manner to the closed circuit. In this case, the pressure is predefined by applying a pressure to the container level. Another option consists in the production of a pressure by means of additional elements, for example an appropriate pumping device.

The means for filling comprise an operating medium container device and means for operating medium transport, for example pumping devices. These are also used to compensate for losses.

Under a further aspect of the invention, in order to simplify the overall system, the means for filling and emptying and the means for predefining the pressure are formed by one system. In this case, the filling and emptying are preferably likewise carried out via the container connected in a pressure-tight manner to the closed system, and by exerting a pressure on the container level or via pumping devices.

A further development of the invention includes the provision or the assignment of upright back-pressure pipes in relation to the outflow chamber, which is bounded by a co-rotating housing part. A plurality of upright back-pressure pipes are preferably provided, being arranged at a specific distance from one another in the circumferential direction. When they dip into the outflow chamber, the back-pressure pipes function as a back-pressure pumping device and are connected to the line connections that are coupled to the outflow chamber. In the process, these convert the kinetic energy into pressure energy and in this way automatically generate a cooling circuit, which is required in order to ensure continuous operation of the hydrodynamic component. In a further design of the solution according to the invention, means for dissipating heat are provided in the closed circuit. In this case, these can be designed as cooling devices or heat exchangers.

The solution according to the invention is suitable for hydrodynamic components in the form of hydrodynamic couplings, comprising a pump wheel and a turbine wheel which, with each other, form at least one toroidal working chamber—two toroidal working chambers in a design as a double coupling—and hydrodynamic speed/torque converters. Only one closed external circuit is required, via which different functions, in particular the cooling, topping up losses of operating medium and controlling the filling level are implemented.

In the case of a design as a hydrodynamic coupling, this comprises a housing which is firmly coupled to the pump wheel so as to rotate with it and which is also designated a coupling shell. In this case, a seal is provided between the turbine wheel and the coupling housing, the chamber formed in this way forming an outflow chamber. Furthermore, a further seal is provided between the pump wheel shell and a housing part which is fixed in its location or stationary. The outer circumference of the pump wheel and the inner circumference of the coupling shell, and also the stationary housing part in this case bound a back-pressure pump chamber, into which the upright back-pressure pipes project. The back-pressure pipes are connected to the lines of the closed circuit via line connections in the stationary housing part. The line connections are designed in such a way that these are likewise pressure-tight. Furthermore, for the purpose of pressure-tight designs of the closed circuit between the pump wheel and the turbine wheel, sealing devices are required, and a co-rotation seal is preferably arranged in the region underneath the inner circumference of the vaned parts of pump wheel and turbine wheel, between the latter. These individual seals allow a system which is closed off completely in a pressure-tight manner.

BRIEF DESCRIPTION OF THE DRAWINGS

The solution according to the invention is explained below using Figures, in which, in detail.

DESCRIPTION OF PREFERRED EMBODIMENTS

Figure 1:
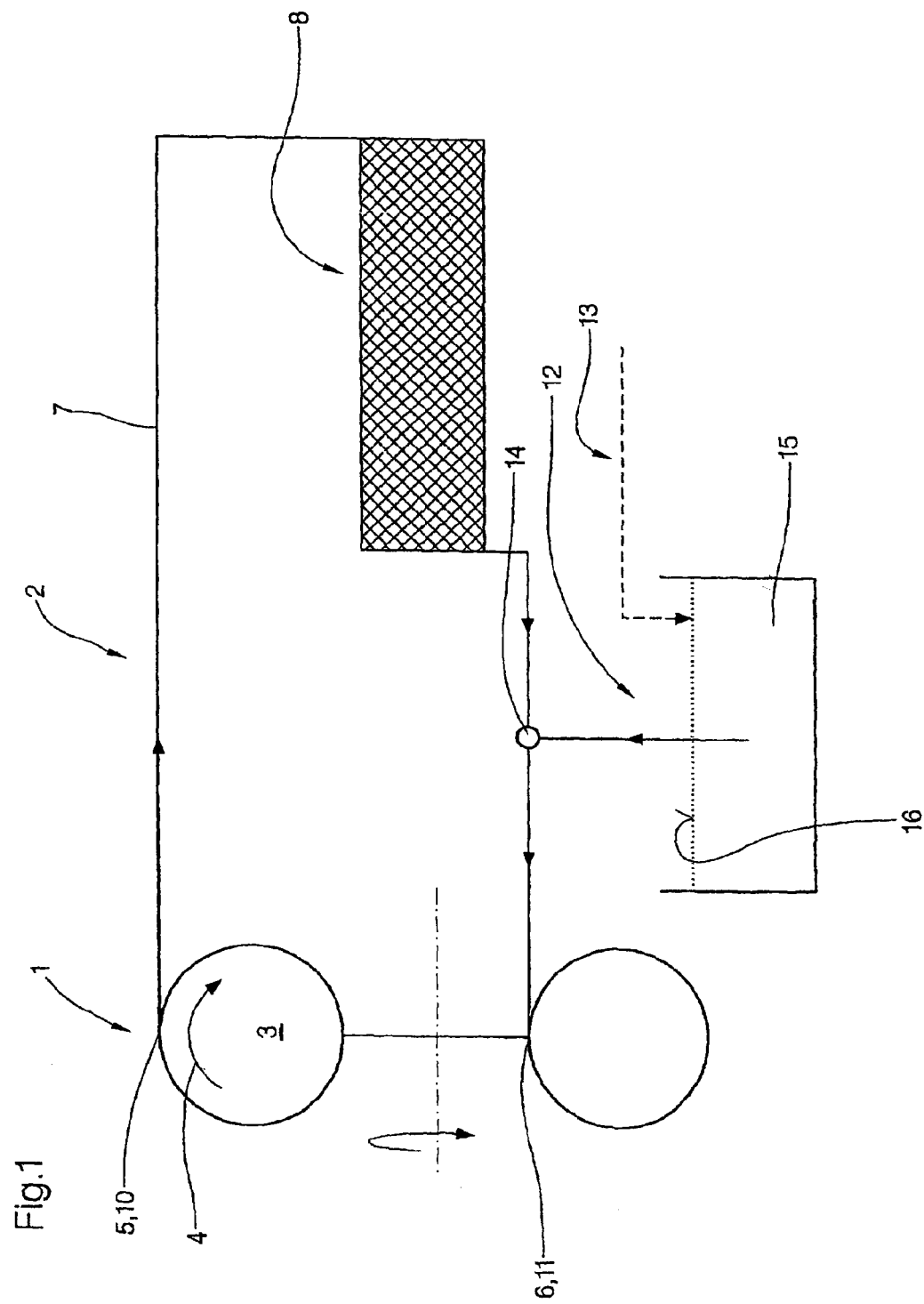
FIG. 1 illustrates, in a schematically simplified illustration, the basic principle of the construction and the functioning of a hydrodynamic component with a closed circuit.

FIG. 1 illustrates, in a schematically simplified representation, the basic principle of the construction and the functioning of a hydrodynamic component 1 with a closed circuit 2 in the form of a closed pressure system, which includes the functions of cooling, topping up lost operating medium and applying an external pressure in the form of a static superimposed pressure to influence the filling level of the working chamber. The hydrodynamic component 1 comprises at least one rotating impeller, depending on the design of the hydrodynamic component 1, in the form of a pump wheel 18 in the case of a hydrodynamic coupling 17 (FIG. 2a) or a hydrodynamic converter which, in interaction with at least one further vaned wheel, forms a working chamber 3, which is generally toroidal. During operating of the hydrodynamic component 1, what is known as a working circuit 4 is established in the toroidal working chamber 3, also being referred to as a hydrodynamic circuit. This working circuit 4 is integrated in the closed circuit 2 or is a constituent part of the closed circuit 2 in the sense that the latter is viewed as a functional unit to which operating medium can be fed and/or from which it can be discharged in the closed circuit 2. The working circuit 4 is assigned at least one outlet 5 and an inlet 6. The outlet 5 is in this case connected to an external part 7 of the closed circuit 2, that is a part led outside the toroidal working chamber 3. Furthermore, the inlet 6 is also connected to an external part 7 of the circuit 2, that is a part led outside the toroidal working chamber 3. The closed circuit 2 is designed to be pressure-tight, that is as a closed pressure system. Provided in the closed circuit 2, in particular in the external part of the circuit 2, that is that part led outside the toroidal working chamber 3, means 8 for influencing the temperature of the operating media carried in the closed circuit 2 are preferably provided. These can be designed in the form of a heat exchanger or as a cooling device, as illustrated in FIG. 1. For the cooling function, in this case, during the operating of the hydrodynamic component 1, operating media is led out of the toroidal working chamber 3 in accordance with the heating of the operating medium in the toroidal working chamber 3 via the closed circuit 2 and the cooling device 8 included therein and, following appropriate cooling, is fed to the working chamber 3 again. The control of the operating medium flow in the closed circuit 2 can be carried out differently in this case, in the simplest case as a function of the rotational speed of the rotating circuit parts or is temporarily stored downstream of the outlet 5 in an outflow chamber 10 or a chamber coupled to the latter and, via corresponding devices not illustrated, for example back-pressure pumps, fed to the external part 7 of the closed circuit 2, and the circuit is automatically maintained by means of these pumps. Furthermore, there is the possibility of controlling the feed flow of operating medium from the external part 7 of the circuit 2 to the inlet 6 of the toroidal working chamber 3. In this case, the inlet 6 is coupled, for example, to a feed chamber 11.

According to the invention, in order to implement the functions of topping up lost operating medium and influencing the filling level in the toroidal working chamber 3 of the hydrodynamic component 1, means for filling 12 and means 13 for applying pressure are allocated. These can be attached to the closed circuit 2 via a junction 14. In this case, the junction 14 is formed in the simplest case by a valve device which comprises at least two switching positions, a first switching position which permits complete decoupling of the means for filling 12 and/or the means 13 for predefining the pressure, and a second switching position, which permits coupling. The means of filling 12 and the means for predefining pressure 13 are preferably formed by an element or system, for example an external operating medium supply tank 15, which is connected to the closed circuit 2 via the junction 14 indirectly via an additional power source, for example a hydrostatic pump or another device. In this case, the lost operating medium is topped up from the external operating medium supply tank 15, and in addition, with a pressure-tight design or attachment to the operating medium supply tank 15, a static superimposed pressure in addition to the pressure in closed circuit 2 can also be produced, it being possible for this pressure to be produced either by an appropriate pumping device or, for example, air pressure on the operating medium level in the external operating medium supply tank 15. The operating medium level is designated 16.

Figure 2A:
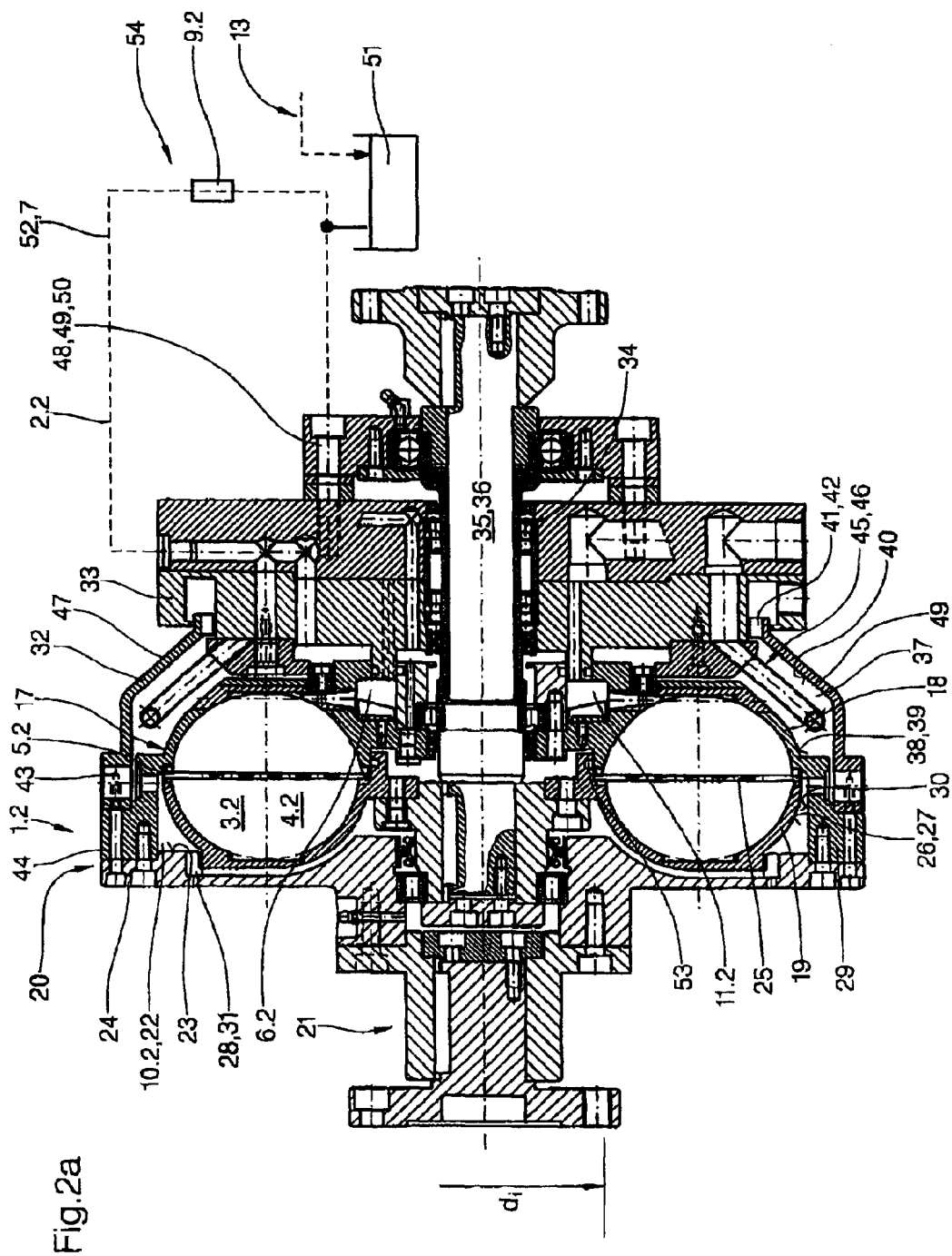
FIGS. 2a and 2b illustrate schematically, by using one design of a hydrodynamic component in the form of a hydrodynamic coupling, a preferred example of a hydrodynamic component with a closed circuit.

FIG. 2a illustrates schematically, using one design of a hydrodynamic component 1.2 in the form of a hydrodynamic coupling 17, an example of a closed circuit 2.2. For this purpose, a possible design of the hydrodynamic coupling 17 for attaching the closed circuit 2.2 will be discussed in terms of its constructive design, by way of example. The hydrodynamic coupling 17 comprises at least one primary wheel functioning as a pump wheel 18 and a secondary wheel functioning as a turbine wheel 19, which together form the toroidal working chamber 3.2. The hydrodynamic coupling 17 also has a housing 20, which is firmly connected to the pump wheel 18 so as to rotate with it. In this case, the housing 20 is also firmly coupled to the drive 21 of the hydrodynamic coupling 17 so as rotate with it. The actual configuration of the rotationally fixed connections is left to the judgement of the responsible persons skilled in the art, for which purpose it will not be discussed in more detail at this point.

Here, the housing 20 encloses the turbine wheel 19 in the axial direction, forming a first intermediate space 22. The first intermediate space 22 is in this case bounded by a housing inner wall 23 of a first housing part 24, the outlet 5.2 from the pump wheel 18 in the region of a dividing plane 25 between the pump wheel 18 and the turbine wheel 19, the outer circumference 26 in the region of the radially outer extent 27 of the turbine wheel 19, and a further, second housing part 29 firmly connected directly to the pump wheel 18 so as to rotate with it or forming a structural unit with the pump wheel 18, in particular the inner surface 30 of said second housing part 29. In this case, means 28 are provided to seal off the intermediate space 22 between the housing 20 and the turbine wheel 19. These sealing means 28 comprise at least one non-contact sealing device 31, which is preferably designed in the form of a labyrinth seal. The housing 20 also forms a further, second intermediate space 37 with the pump wheel 18 and a further housing part 32 firmly coupled to the pump wheel 18 so as to rotate with it, and also a second housing 33 which rotates at a relative speed in relation to the housing 20 but is preferably stationary and which is mounted via a bearing arrangement 34 on a driven shaft 36 forming the output drive 35 from the hydrodynamic coupling 17. Said second intermediate space 37 is substantially formed by the outer surface 38 of the pump wheel 18 in the radially outer region 39, the second housing part 29 bearing the housing inner wall 23, and an inner surface 40 of the housing part 32 of the housing 20, at least partly including the pump wheel 18 in the axial direction. The stationary housing 33 can be designed in one piece or else in several pieces. Sealing of the second intermediate space 37, required in order to implement the circuit 2.2 closed in a pressure-tight manner, is provided by sealing means 41 between the housing 20 and the round housing 33, which preferably comprise a non-contact seal in the form of a labyrinth seal 42. In this case, the first intermediate space 22 forms the outflow chamber 10.2 from the working circuit 3.2 of the hydrodynamic coupling 17. The first intermediate space 22 is connected to the second intermediate space 37 via passage openings 43 in the housing wall 44 of the second housing part 29. In the second intermediate space 37, means 45 are allocated to discharge operating medium which, during operation of the hydrodynamic coupling 17, has passed into the second intermediate space 37 through the operating medium guidance in the toroidal working chamber 3.2, said means comprising at least one back-pressure pump 46, for example.

In accordance with the desired quantity of operating medium to be discharged and of the time available for this purpose, a plurality of back-pressure pumps 46 are preferably provided as a function of the possible flow cross section which can be provided by dimensioning the back-pressure pump 46, said back-pressure pumps 46 preferably being arranged at uniform intervals in the circumferential direction in the intermediate space 37 or penetrating into the latter. The second intermediate space 37 in this case forms what is known as the back-pressure pump chamber 49. The back-pressure pump housing is formed by the stationary housing 33 and the pump wheel shell 47 which is formed by the third housing part 32 of the housing 20. The means of discharging 45 operating medium from the outflow chamber 10.2, in particular the back-pressure pumps 46, are in this case connected to means 48 for guiding operating medium in the closed circuit 2.2. To this end, the means 48 preferably comprise line connections 49 in the form of operating medium guide ducts 50, which are machined partly in the housing wall facing the pump 18 and the stationary housing 33. In the design illustrated, the inlet chamber 11.2 is arranged substantially in a region of the internal diameter of the pump wheel 18. The closed circuit 2.2 is designed to be pressure-tight, the appropriate line connections 52 which follow the hydrodynamic coupling 17 and which are a constituent part of the external part of the closed circuit 7, being merely illustrated here by means of a broken line. Said closed circuit 7 is assigned an operating medium storage device 51, which is connected to the closed circuit 2.2, for example by means of a line connection 52. The operating medium storage device 51 is preferably arranged in the region below the height of the toroidal working chamber 3.2, in particular the radial dimensions which are on the outside in the installed position of the individual impellers 18 and 19. A safeguard via a siphon or other aid can be dispensed with in this case. Here, the operating medium storage device 51 is connected in a pressure-tight manner to the entry or inlet 6.2 to the toroidal working chamber 3.2. The sealing means 41 for the second intermediate space 37, in particular of the back-pressure pump housing and the pump wheel shell 47, and also the sealing means 28 between turbine wheel 19 and the rotating housing 20 are arranged physically above the meridional center in the circumferential direction and underneath the maximum profile diameter of the two impellers—pump wheel 18 and turbine wheel 19. Furthermore, additional sealing means 53 are provided between pump wheel 18 and turbine wheel 19, said means being arranged underneath the inner diameter $d_1$ of the toroidal working chamber 3.2, as viewed in the radial direction. The closed circuit 2.2 is therefore pressure-tight with respect to the surroundings. The attachment of the operating medium storage device 51 to the closed circuit 2.2 is likewise carried out in a pressure-tight manner.

The housing of the hydrodynamic component, in particular the housing 20, the pump wheel 18, the turbine wheel 19, the closed circuit 2.2 and the pressure-tight coupling of the operating medium storage device 51 to the closed circuit 2.2, and the means 13 for influencing the pressure in the closed circuit, form means 54 for producing a pressure balance between a closed rotating circuit 2.2 and a stationary medium. The closed circuit 2.2 is implemented between the outlet 5.2 from the toroidal working chamber 3.2 in the region of the dividing plane 25, and the inlet 6.2 to the pump wheel 18. The operating medium passes from the flow circuit, in particular the working circuit 4.2 in the toroidal working chamber 3.2, via the outlet openings 43 in the region of the dividing plane of the pump wheel 18 and of the turbine wheel 19 and the connecting ducts 43 into the second intermediate space 37, from which the operating medium is guided via the means 45 for discharge from the second intermediate space, in particular the back-pressure pumps 45 in the closed circuit 2.2.

Figure 2B:
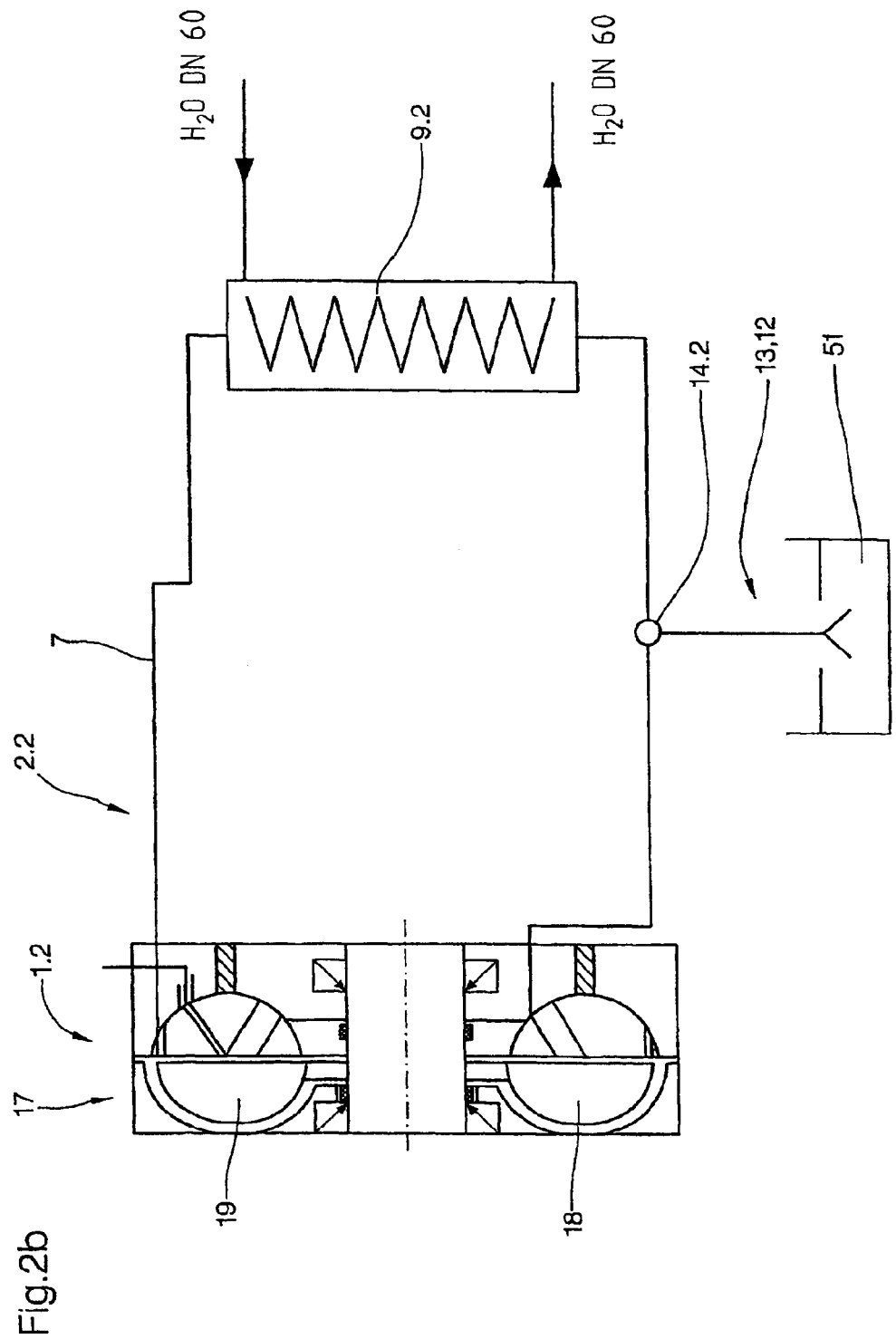

FIG. 2b illustrates once more, highly schematically, the design according to FIG. 2a of a hydro-dynamic coupling 17 with closed circuit 2.2. The same designations are used for the same elements. The operating medium storage device 51 is attached via the junction 14.2. It is also possible to see the function of the heat exchanger 9.2.

Figure 3:
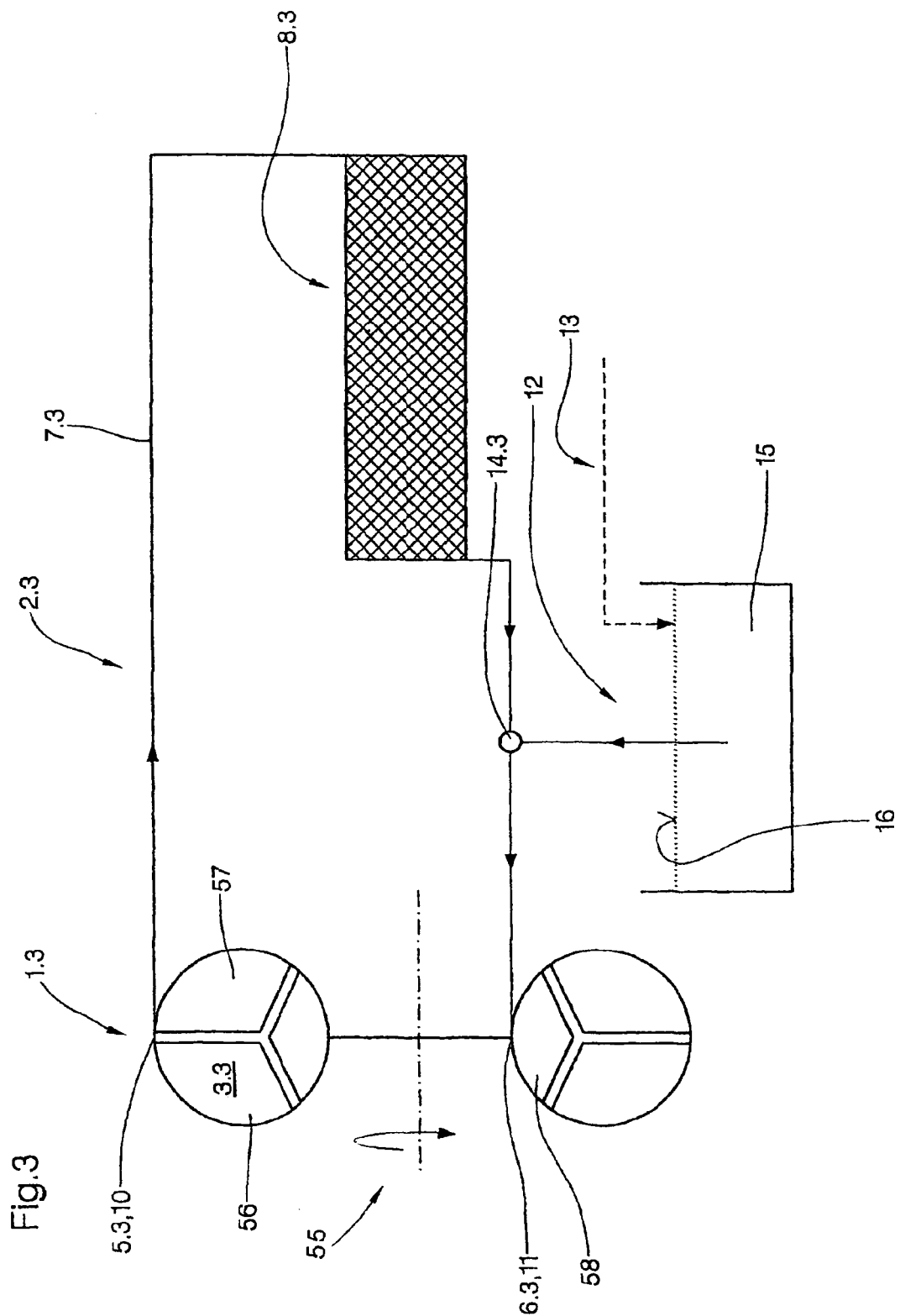
FIG. 3 illustrates a hydrodynamic component configured according to the invention in the form of a hydro-dynamic speed/torque converter with a closed circuit.

FIG. 3 illustrates, by using a schematic drawing in a highly simplified representation, a design of a hydrodynamic component 1.3 in the form of a hydrodynamic speed/torque converter 55 with closed circuit 2.3. The basic structure corresponds to that described in FIGS. 1 and 2b, for which reasons the same designations are used for the same elements.

The hydrodynamic speed/torque converter 55 comprises, in addition to a pump wheel 56, a turbine wheel 57 and at least one guidewheel 58, the individual impellers forming a toroidal working chamber 3.3. Here, too, the hydrodynamic component 1.3 is assigned a closed circuit 2.3, which comprises the working circuit 4.3 led in the toroidal working chamber 3.3 and an external part 7.3 of the circuit 2.3. The closed circuit 2.3 is likewise designed to be pressure-tight and, via a junction 14.3, with means 12 for filling and emptying the closed circuit 2.3 and/or means 13 for influencing the filling level in the form of means for predefining the pressure or producing a static superimposed pressure in addition to the pressure in the closed circuit 2.3.

What is claimed is:

1. A hydrodynamic component comprising
   first and second cooperating rotatable impellers which are shaped and positioned for defining a working chamber between them in a working circuit, wherein the impellers are so-shaped
   that rotation or halting of one impeller when an operating medium is present in the working chamber tends to respectively rotate or halt the other impeller, the working chamber having an inlet for supply of operating medium thereto and having an outlet for exit of operating medium therefrom;
   a drive to the first impeller; a driven connection to the second impeller for being driven by rotation of the second impeller;
   a pressure-tight closed circuit coupled to the working chamber inlet;
   a device selectively operable for at least one of filling and emptying the closed circuit of operating medium and for predefining the pressure to the closed circuit, and a junction from the device to the closed circuit; a pressure-tight connection between the device for predefining pressure and the closed circuit;
   the device for predefining pressure comprising a device for producing a static superimposed pressure in the closed circuit, the device for predefining pressure comprises a container fillable with an operating medium and the container being attached at the junction to the circuit in a pressure tight manner; and a device for supplying air pressure to the container of the device for predefining pressure.

2. The hydrodynamic component of claim 1, wherein the closed circuit includes the working chamber defined by the impellers and further comprises an external part outside the working chamber and connected thereto.

3. The hydrodynamic component of claim 2, further comprising apparatus for influencing the temperature in the operating medium and being disposed in the external part of the circuit.

4. The hydrodynamic component of claim 3, wherein the device for influencing the temperature of the operating medium comprises a heat exchanger.

5. The hydrodynamic component of claim 3, wherein the device for influencing the temperature of the operating medium comprises a cooling device.

6. The hydrodynamic component of claim 1, wherein the device for selectively filling and emptying the closed circuit is comprised of the device for predefining the pressure.

7. The hydrodynamic component of claim 1, wherein the device for filling and emptying is separate from the device for predefining pressure.

8. The hydrodynamic component of claim 1, wherein the impellers define a hydrodynamic coupling comprising a pump wheel defined at one of the impellers and a turbine wheel defined at the other of the impellers, and the pump wheel and the turbine wheel together are shaped and positioned to define a toroidal working chamber between them.

9. A hydrodynamic component comprising
   first and second cooperating rotatable impellers which are shaped and positioned for defining a working chamber between them in a working circuit, wherein the impellers are so-shaped
   that rotation or halting of one impeller when an operating medium is present in the working chamber tends to respectively rotate or halt the other impeller, the working chamber having an inlet for supply of operating medium thereto and having an outlet for exit of operating medium therefrom;
   a drive to the first impeller; a driven connection to the second impeller for being driven by rotation of the second impeller;
   a pressure-tight closed circuit coupled to the working chamber inlet;
   a device selectively operable for at least one of filling and emptying the closed circuit of operating medium and for predefining the pressure to the closed circuit, and a junction from the device to the closed circuit; a pressure-tight connection between the device for predefining pressure and the closed circuit;
   the device for predefining pressure comprising a device for producing a static superimposed pressure in the closed circuit, a device for supplying air pressure to the container of the device for predefining pressure and the device for producing a static superimposed pressure comprises a pump.

10. A hydrodynamic component comprising
    first and second cooperating rotatable impellers which are shaped and positioned for defining a working chamber between them in a working circuit, wherein the impellers are so-shaped
    that rotation or halting of one impeller when an operating medium is present in the working chamber tends to respectively rotate or halt the other impeller, the working chamber having an inlet for supply of operating medium thereto and having an outlet for exit of operating medium therefrom;
    a drive to the first impeller; a driven connection to the second impeller for being driven by rotation of the second impeller;
    a pressure-tight closed circuit coupled to the working chamber inlet;
    a device selectively operable for at least one of filling and emptying the closed circuit of operating medium and for predefining the pressure to the closed circuit, and a junction from the device to the closed circuit; a pressure-tight connection between the device for predefining pressure and the closed circuit;
    the device for predefining pressure comprising a device for producing a static superimposed pressure in the closed circuit; and
    an outflow chamber from the working chamber and the outflow chamber forming a back pressure pump chamber adapted for having back pressure developed therein.

11. The hydrodynamic component of claim 10, further comprising a plurality of back pressure pipes disposed in and supplying back pressure to the back pressure pump chamber.

12. The hydrodynamic component of claim 11, further comprising a plurality of the back pressure pipes arranged at spaced apart intervals in the circumferential direction around the back pressure pump chamber and the working chamber.

13. A hydrodynamic component comprising first and second cooperating rotatable impellers which are shaped and positioned for defining a working chamber between them in a working circuit, wherein the impellers are so-shaped that rotation or halting of one impeller when an operating medium is present in the working chamber tends to respectively rotate or halt the other impeller, the working chamber having an inlet for supply of operating medium thereto and having an outlet for exit of operating medium therefrom;

a drive to the first impeller; a driven connection to the second impeller for being driven by rotation of the second impeller;

a pressure-tight closed circuit coupled to the working chamber inlet;

a device selectively operable for at least one of filling and emptying the closed circuit of operating medium and for predefining the pressure to the closed circuit, and a junction from the device to the closed circuit; a pressure-tight connection between the device for predefining pressure and the closed circuit;

the device for predefining pressure comprising a device for producing a static superimposed pressure in the closed circuit, the pump wheel comprises a housing shaped to enclose the turbine wheel in the axial direction, and the housing being connected with the pump wheel to rotate with the pump wheel;

a first seal between the turbine wheel and the housing connected to the pump wheel; a second seal between the housing and a separate housing not rotatable with the first housing;

a third seal between the pump wheel and the turbine wheel and located radially inward of the toroidal working chamber;

a feed chamber and an outlet chamber for the toroidal working chamber and lines connecting the feed chamber and the outlet chamber in a pressure-tight manner with the torodial working chamber.

* * * * *